United States Patent
Ettl et al.

(10) Patent No.: US 8,036,957 B2
(45) Date of Patent: Oct. 11, 2011

(54) METHOD FOR MANAGING INVENTORY UNDER PRICE PROTECTION

(75) Inventors: Markus Ettl, Yorktown Heights, NY (US); Pu Huang, Yorktown Heights, NY (US); Roman Kapuscinski, Ann Arbor, MI (US); Karthik Sourirajan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 12/127,412

(22) Filed: May 27, 2008

(65) Prior Publication Data
US 2009/0299779 A1    Dec. 3, 2009

(51) Int. Cl.
*G06Q 10/00* (2006.01)
*G06G 1/14* (2006.01)
*G06F 17/00* (2006.01)

(52) U.S. Cl. ............... 705/28; 705/22; 705/400
(58) Field of Classification Search .......... None
See application file for complete search history.

(56) References Cited

U.S. PATENT DOCUMENTS

| | | | |
|---|---|---|---|
| 7,885,867 B2 * | 2/2011 | Krystek et al. | 705/28 |
| 2002/0072956 A1 * | 6/2002 | Willems et al. | 705/10 |

OTHER PUBLICATIONS

Fry, Michael J. et al., Coordinating Production and Delivery Under a (z,Z)-Type Vendor-Managed Inventory Contract, Manufacturing & Service Operations Management, 2001 INFORMS, Spring 2001, pp. 151-173, vol. 3, No. 2.

Lee, Hau L. et al., Price Protection in the Personal Computer Industry, Management Science, 2000 INFORMS, Apr. 2000, pp. 467-482, vol. 46, No. 4.

Taylor, Terry A., Channel Coordination Under Price Protection, Midlife Returns, and End-of-Life Returns in Dynamic Markets, Management Science, 2001 INFORMS, Sep. 2001, pp. 1220-1234, vol. 47, No. 9.

* cited by examiner

*Primary Examiner* — Ryan Zeender
*Assistant Examiner* — Fahd A Obeid
(74) *Attorney, Agent, or Firm* — Scully, Scott, Murphy & Presser, P.C.; Elissa Y. Wang, Esq.

(57) ABSTRACT

A method and system for managing inventory under price protection plan determine an inventory replenishment plan for one or more goods considering a price protection agreement including at least length of price protection between at least two supply chain partners in a supply chain having decentralized control over a predetermined time period.

10 Claims, 2 Drawing Sheets

METHOD FOR MANAGING INVENTORY UNDER PRICE PROTECTION

FIELD OF THE INVENTION

The present application relates to supply chain systems generally, and more particularly to determining optimized inventory replenishments at distributors in a decentralized supply chain in the presence of price protection.

BACKGROUND OF THE INVENTION

Price protection is a common business practice intended to counteract the effects of high technological obsolescence. For example, in high-technology industries where the risk of technological obsolescence is high, price protection has become a standard element of contracts between manufacturers (OEMs) and distributors or retailers. Distributors perceive price protection as a fair and necessary mechanism through which manufacturers (OEMs) decrease the effects of brutal price erosion on operations of distributors. To exercise a price protection contract, an OEM evaluates its distributors' purchases over the price protection period at the time of a price change, and compares the purchase quantity to the distributor's current inventory holdings. Whichever is smaller is the price protected quantity. The OEM issues the distributor a credit equal to the product of that quantity and the price decrease.

The following illustrates a simple example of how price protection works. A computer distributor places an order for 100 server computers at $800 per unit. There is a price protection contract with the original equipment manufacturer (OEM), with the price protection period being 4 weeks. At the end of 3 weeks, the distributor is left with 30 units after a demand of 70 units is satisfied. At this point, the OEM reduces the wholesale price to $700 per unit, reducing the value of the distributor's inventory by $100 per unit. The price protected quantity is the unsold inventory of 30 units as it is lower than the 100 units ordered within the last 4 weeks. The price protection credit given to the distributor is the product of the unsold inventory and the price decrease, or $3,000 dollars in this example.

Previous studies on price protection contracts have considered only a single-period setting using parallels to buy-back contracts. Those studies do not address price protection in a natural multi-period setting. In addition, while known methodologies have addressed optimizing inventory stocking levels at a distributor location, those methodologies do not consider the effects of price protection on the stocking decision. Accordingly, it would be desirable to have a method and system that capture time-dynamics of price protection programs in inventory stocking or replenishment.

BRIEF SUMMARY OF THE INVENTION

A method and system for managing inventory under price protection plan are provided. The method, in one aspect, may comprise determining an inventory replenishment plan for one or more goods considering a price protection agreement including at least length of price protection between at least two supply chain partners in a supply chain having decentralized control. In another aspect, the supply chain partners may comprise at least one buyer of said one or more goods and at least one seller of said one or more goods. Yet in another aspect, the step of determining said inventory replenishment plan may include solving a stochastic program that uses buyer's objective or seller's objective.

A system for managing inventory under price protection plan, in one aspect, may comprise a processor, and a stochastic model executing on the processor operable to determine an inventory replenishment plan for one or more goods over a plurality of time periods. The stochastic model uses at least price protection agreement including at least length of price protection between at least two supply chain partners in a supply chain, future demand distribution, and expected future cost and price as inputs. The stochastic model may be formulated as decentralized model.

A program storage device readable by a machine, tangibly embodying a program of instructions executable by the machine to perform above method for managing inventory under price protection may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
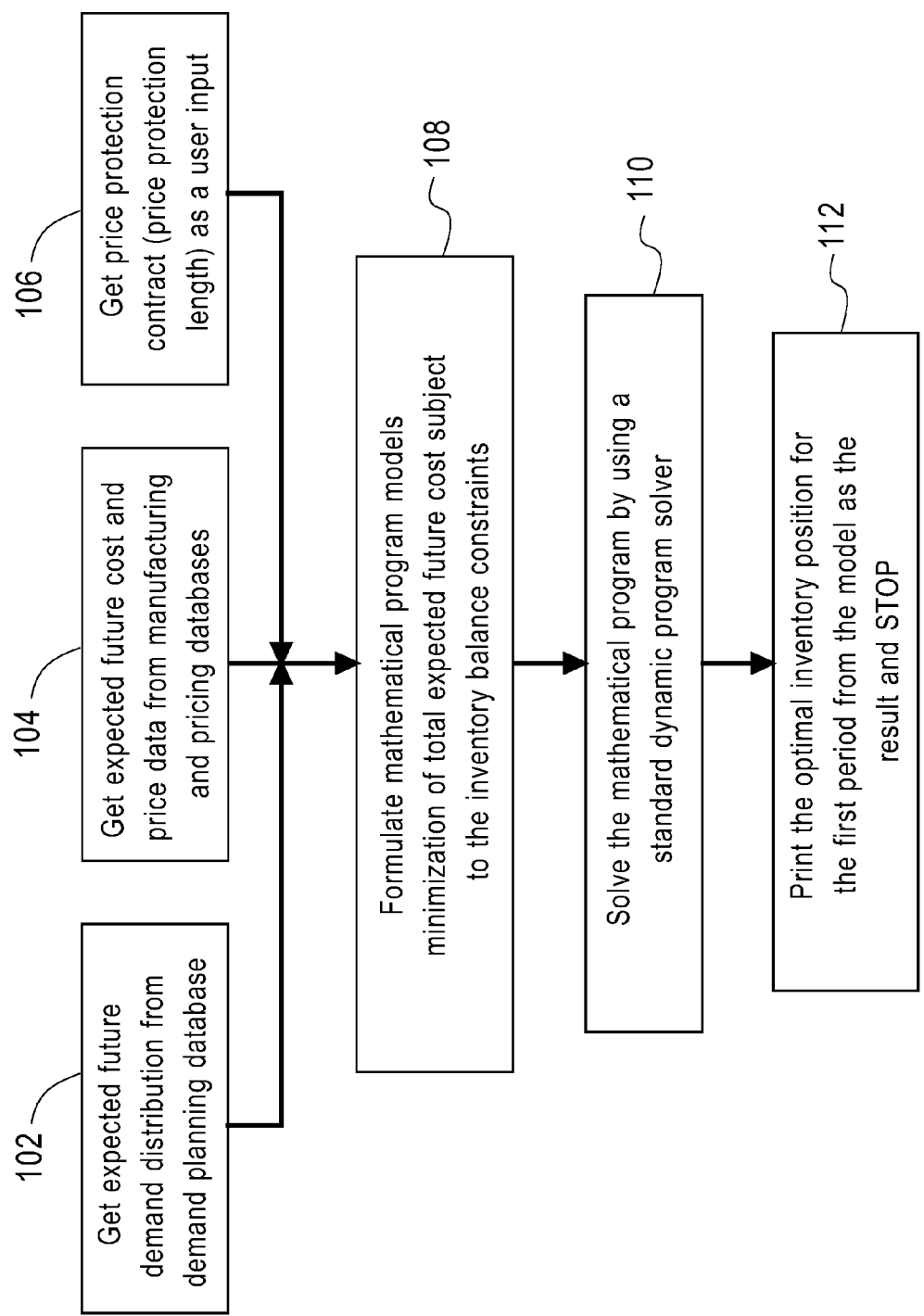
FIG. 1 is a flow diagram illustrating a method of managing inventory under price protection in one embodiment.

A method and system are presented that determine optimized inventory replenishments at distributors in a decentralized supply chain in the presence of price protection.

Consider a distributor (D) who buys the product from a vendor or manufacturer (M, OEM) at a wholesale price and sells it to the end-customer at a retail price over T periods. At the end of each period, distributor places an order which is produced by the manufacturer and delivered to the distributor at the beginning of the next period. The production cost, wholesale price, and retail price decrease over time. The decrease is stochastic and becomes known at the beginning of each period. All decisions in a given period are made with a knowledge of current-period prices and the statistical distribution of changes in the future periods. Distributor is charged the actual wholesale price at the time an order is placed.

In one embodiment of the present disclosure, it is assumed that all production is to distributor's orders and, therefore, manufacturer holds no inventory. The distributor, on the other hand, facing uncertain demand attempts to satisfy it from stock. Distributor's excess inventory is held to the next period. In the case of any shortage, the needed products are produced and expedited to the end-customer. When goods are expedited, both the manufacturer and the distributor are penalized for distributor's shortage and incur a cost due to loss of customer goodwill in addition to the regular cost of producing the product and any expediting costs. This is a close representation of actual practice, where in case components are available, the manufacturer is able, at an additional cost, to produce the product and expedite it, often by offering additional discounts to the customer. Both manufacturer and distributor discount their cash flows at the same rate. The state of the system is observable and all information is transparent to manufacturer and distributor. We assume that all variables are exogenous (given inputs to the model), except ordering quantities The present disclosure discloses both a vendor managed inventory model and a distributor managed inventory model.

The system and method of the present disclosure allows either model to be utilized in a decentralized manner, depending on the desired solution. Vendor managed inventory (VMI) refers to an inventory model or method in which the manufacturer (or OEM) makes stocking decisions to optimize its costs. Distributor managed inventory (DMI) refers to an inventory model or method in which the distributor makes stocking decisions to optimize its costs.

A decentralized supply chain or decentralized model refers to a model that considers either distributor managed inventory or vendor managed inventory. In such a model, the stocking decisions are made to optimize the costs of an individual supply chain entity rather than the total supply chain cost. For example, in the case of one OEM and one distributor, the total supply chain cost would be the sum of the OEM's cost and distributor's cost. However, using a DMI policy would make decisions that optimize the distributor's cost only and using a VMI policy would make decisions that optimize the OEM's cost only. Since the two policies do not try to optimize the total supply chain cost, the decisions made may not be the same as each other or same as those obtained by optimizing the total cost.

FIG. 1 is a flow diagram illustrating a method of managing inventory under price protection in one embodiment. At step 102, expected future demand distribution is obtained, for example, from a demand planning database. A demand planning database, for instance, may include supply planning algorithms or like that plans or establishes sales or supply forecasts, using various inputs, parameters and constraints, and performs various analyses to improve the understanding and planning of supplies and resources.

At step 104, expected future cost and price data is obtained, for instance, from manufacturing and pricing databases. Manufacturing and pricing database may include information regarding costs of the goods and additional information such as the cost of having excess inventory and discounts given to distributors.

At step 106, information associated with a price protection contract is obtained, for instance, from a user as a user input. Price protection contract specifies price protection length and other parameters or attributes associated with the price protection agreement between the vendor and the buyer.

At step 108, one or more mathematical program models are formulated that minimize the total expected future cost subject to the inventory balance constraints. The inventory balance constraints require that the distributor's starting inventory in a given time period after placing any orders is at least equal to the ending inventory of the previous time period after the demand for the last time period is satisfied. If it is desired to minimize the distributor's expected future cost using a DMI policy, the DMI model may be utilized in the formulation. If it is desired to minimize the manufacturer's cost using a VMI policy, the VMI model may be used in the formulation.

At step 110, the mathematical program models may be solved by using a standard dynamic program solver, for instance, to find the optimal solutions of the overall problem.

At step 112, the results of the mathematical program models, for instance, the optimal inventory position for the first period may be printed and/or presented. If the demand for future time periods is completely known then, the model may also print the optimal inventory positions for the entire planning horizon.

In one embodiment of the present disclosure, the following DMI and VMI models are formulated, with the following notations.

Costs and Penalties:
$c_t$=Production cost in period t (at manufacturer)
$w_t$=Wholesale price in period t (manufacturer to distributor)
$h_t$=Inventory carrying cost at distributor in period t
$g_t^D$=Shortage cost for distributor in period t (includes expediting costs, customer goodwill costs, etc.)
$g_t^M$=Shortage cost for manufacturer in period t (includes expediting costs, customer goodwill costs, etc.)

Demand and Price Protection:
$D_t$=Demand in period t with cumulative distribution function $\Phi_t(.)$, independent of price erosion
T=Planning horizon length, t in 1 . . . T
L=Length of price protection (number of periods)
$\beta$=Discount factor Decision Variables and Objective:
$y_t$=Order up-to level in period t, $y_t=x_t+a_t$
$x_t$=Starting inventory in period t (at distributor), $x_t=(y_{t-1}-D_{t-1})^+$
$a_t$=Order quantity in period t (manufacturer to distributor)
$V'^D_t(.), V^D_t(.)$=Distributor's discounted total costs from period t to T
$V^M_t(.)$=Manufacturer's discounted cost from period t to T
$W'^D_t(.), W^D_t(.)$=Distributor's myopic one-period costs
$W^M_t(.)$=Manufacturer's myopic one-period costs In the following, we will use Ez to denote the expected value of z. As explained above, price protection provides a partial protection against price drops. It is partial protection because the length of the price protection period is fixed and any price drops that occur outside the price protection period are not credited. At the time of price drop, the price protected quantity, $PPQ_t$, is given by the minimum of the inventory on hand at the start of time period t and the sum of the orders in the past L periods. Mathematically, it can be written as:

$$PPQ_t = \min\left\{x_t, \sum_{s=t-L}^{t-1} a_s\right\}$$

Using the fact that $y_t=x_t+a_t$ and $x_t=(y_{t-1}-D_{t-1})^-$, it can be proved that $$PPQ_t = \sum_{k=1}^{L} \min\{(y_{t-k} - D[t-k, t-1])^+, y_{t-k} - x_{t-k}\}$$

where $D[t-k,t-1]$ is the convolution of demands $D_{t-k}, \ldots D_{t-1}$.

The above expression can be interpreted as the sum of the quantities bought in the last L periods that are still on inventory (and thus, unsold). Thus, the price protection credit ($PPC_t$) paid to the distributor due to price drop in time period t can be given by:

$$PPC_t = (w_{t-1} - w_t)\sum_{k=1}^{L} \min\{(y_{t-k} - D[t-k, t-1])^+, y_{t-k} - x_{t-k}\}$$

The following illustrates a DMI model with price protection in one embodiment of the present disclosure. In Distributor Managed Inventory (DMI) model, the distributor makes stocking decisions that optimize the distributor's expected cost. As mentioned earlier, the distributor incurs costs for holding any excess inventory at the end of a time period and for being short on inventory compared to the demand in any period. Also, the distributor is credited for price drops based on the price protection contract.

The distributor's myopic expected cost in time period t can be written as:

$$W_t'^D(y_t) = (h_t + w_t - \beta w_{t+1})(y_t - D_t)^+ + g_t^D(D_t - y_t)^+ - $$

$$(w_{t-1} - w_t) \sum_{k=1}^{L} \min\{(y_{t-k} - D[t-k, t-1])^+, y_{t-k} - x_{t-k}\}$$

The above term has three components:
1. The cost of having excess inventory at the end of time period t. This includes the carrying cost paid by the distributor, $h_t(y_t - D_t)^+$, and the opportunity cost of purchasing the goods from the OEM early, $(w_t - \beta w_{t+1})(y_t - D_t)^+$.
2. The cost of having shortage in time period t. This includes any expediting costs and costs due to loss of customer goodwill, $g_t^D(D_t - y_t)^+$.
3. The price protection credit received due to any price drops in time period t, $$\left[-(w_{t-1} - w_t) \sum_{k=1}^{L} \min\{(y_{t-k} - D[t-k, t-1])^+, y_{t-k} - x_{t-k}\}\right].$$

In any time period t, the inventory balance constraint requires that the inventory position in time period t is at least equal to the starting inventory in time period $t(y_t \geq x_t)$. $W_t'^D(.)$ is called the myopic one-period cost function since it does not consider the implication of the inventory position decisions in period $t(y_t)$ on the costs and decisions in future time periods. The relationship between inventory position decision in period t and the inventory position decisions in future time periods is captured by a total expected cost formulation described below.

The total expected cost for the distributor in the entire planning horizon starting from time period t can be formulated as a dynamic program as:

$$V_t'^D(x_t) = \min_{y_t \geq x_t} \{EW_t'^D(y_t) + \beta E_{D_t} V_{t+1}'^D((y_t - D_t)^+)\}$$

The above model considers a plurality of inventory positions, $W_t'^D(.)$, and interdependence between the current period and the next period's decisions, in determining the total cost from period t to T. We have $x_t = (y_{t-1} - D_{t-1})^+$ and require $(y_t \geq x_t)$ in any time period t. These two put together help the total expected cost formulation above capture the impact of the decisions on $y_t$ not only in period t but also in the future periods.

The objective of the DMI model is to optimize the expected value of the above formulation. Dynamic programming (DP) techniques may be used to solve the DMI model formulation and provide the optimal inventory position decisions. The dynamic program framework is well-suited for this problem, since the inventory replenishment decisions have to be made sequentially. Briefly, a dynamic program is an optimization formulation, which can be applied to decision problems typically requiring a sequence of decisions to be made, for instance, under stochastic control. Dynamic programming techniques have been developed in literature to solve dynamic program formulations.

Notice that the distributor's expected cost in time period t, $W_t'^D(.)$, depends not only on the inventory position decision in time period t, but also on the inventory position decisions in the previous L time periods. Such interdependency could complicate the dynamic program being used to solve the above problem and thus we propose a novel reformulation of the dynamic program that helps us analyze temporal dependencies and leads to intuitive interpretations.

Using $E\{\min((y-D)^+, y-x)\} = E\{(y-D)^+ - (x-D)^+\}$, we can write $$E\left[(w_{t-1} - w_t) \sum_{k=1}^{L} \min\{(y_{t-k} - D[t-k, t-1])^+, y_{t-k} - x_{t-k}\}\right] =$$

$$E(w_{t-1} - w_t) \times E\left[\sum_{k=1}^{L}(y_{t-k} - D[t-k, t-1])^+ - \right.$$

$$\left. \sum_{k=1}^{L}(x_{t-k} - D[t-k, t-1])^+\right] = E(w_{t-1} - w_t) \times$$

$$E\left[\sum_{k=1}^{L}(y_{t-k} - D[t-k, t-1])^+ - \sum_{k=1}^{L}(y_{t-k-1} - D[t-k-1, t-1])^+\right]$$

Now, we can rearrange the cost terms with $y_t$ and group them in period t by proper discounting of costs and write the modified distributor's expected cost in period t as $$W_t^D(y_t) = (h_t + w_t - \beta w_{t+1})(y_t - D_t)^+ +$$

$$g_t^D(D_t - y_t)^+ - \sum_{k=1}^{L+1} \beta^k (w_{t+k-1} - w_{t+k}) \times (y_t - D[t, t+k-1])^+$$

i.e., $$W_t^D(y_t) = [w_t(1-\beta) + h_t](y_t - D_t)^+ +$$

$$g_t^D(D_t - y_t)^+ + \beta^{L+1}[w_{t+L} - w_{t+L+1}](y_t - D[t, t+L])^+$$

Notice that such a reformulation does not change the optimal decision and cost for the DMI model and allows us to write every one period cost as a function of just that period's decision. The above one period cost formulation is a convex cost function and thus, the optimal policy is a non-stationary base-stock policy.

We can interpret from the reformulation that, in the absence of discounting, the opportunity cost of buying goods from the OEM early exists only if there is any unsold inventory at the end of the price protection length and is based on the price drop at the end of the price protection period rather than the price drop at the end of period t. The interpretation of the shortage cost and inventory carrying cost do not change from earlier.

Using the reformulation, the total expected cost for the distributor in the entire planning horizon starting from time period t can be formulated as a dynamic program as:

$$V_t^D(x_t) = \min_{y_t \geq x_t} \{EW_t^D(y_t) + \beta E_{D_t} V_{t+1}^D((y_t - D_t)^+)\}$$

Also, the objective of the DMI model is to optimize the expected value of the above formulation. Once again, dynamic programming techniques may be used to solve the DMI model formulation and provide the optimal inventory position decisions.

In Vendor Managed Inventory (VMI) model, the vendor or OEM makes stocking decisions that optimize the vendor's total expected cost. The formulation illustrates a VMI model in one embodiment of the present disclosure.

Under a VMI policy, though the inventory is still stocked at the distributor, the manufacturer incurs costs based on excess or shortage inventory in addition to price protection expenses. If the distributor ends up with excess inventory at the end of a period, the manufacturer potentially produced goods early and thus could lose out on any drops in the manufacturing or component costs. On the other hand, if the distributor ends up being short on inventory, the manufacturer faces shortage costs because of liability for some part of any expediting of goods to the end customer and/or because of loss of customer goodwill.

The myopic one-period expected cost for the vendor can be written (after a reformulation similar to the one done for the DMI model) as:

$$W_t^M(y_t) = ((c_t - \beta c_{t+1}) - (w_t - \beta w_{t+1}))(y_t - D_t)^+ +$$
$$g_t^M(D_t - y_t)^+ + \sum_{k=1}^{L+1} \beta^k (w_{t+k-1} - w_{t+k}) \times (y_t - D[t, t+k-1])^+$$

The above formulation has 3 components:
1. The opportunity cost of producing early, $(c_t-\beta c_{t+1})(y_t-D_t)^+$, minus the gain from selling early, $(w_t-\beta w_{t+1})(y_t-D_t)^-$. Since production is based on distributor orders, any excess inventory at the distributor could lose on any drops in the manufacturing/component costs. However, the manufacturer could also gain from shipping early as the manufacturer would have sold the goods at a higher price to the distributor should there be any drops in wholesale prices. Thus, this component captures the difference between the two as a cost.
2. The cost to the OEM for shortage at the distributor. This can include any expediting costs incurred by the manufacturer and costs due to loss of customer goodwill, $g_t^M(D_t-y_t)$.
3. The price protection credit paid to the distributor, $$\sum_{k=1}^{L+1} \beta^k (w_{t+k-1} - w_{t+k}) \times (y_t - D[t, t+k-1])^+.$$

The myopic one-period formulation can be re-written as:

$$W^M(y_t) = [(c_t-\beta c_{t+1}) - w_t(1-\beta)](y_t-D_t)^+ g_t^M(D_t-y_t)^+ - \beta^{L+1}[w_{t+L}-w_{t+L+1}](y_t-D[t,t+L])^+$$

We can interpret from the above formulation that, in the absence of discounting, the price protection credit offsets the advantage of shipping early by the price protection length and further, it applies only on any inventory unsold at the end of the price protection period. The interpretation of the shortage cost does not change from earlier.

The total expected cost for the vendor in the entire planning horizon starting from time period t can be written as:

$$V_t^M(x_t) = \min_{y_t \geq x_t} \{EW_t^M(y_t) + \beta E_{D_t} V_{t+1}^M((y_t - D_t)^+)\}$$

The objective of the VMI model is to optimize the expected value of the above formulation. Similar to the DMI model described above, a dynamic programming approach can be used to obtain the optimal inventory positions for the VMI model.

Figure 2:
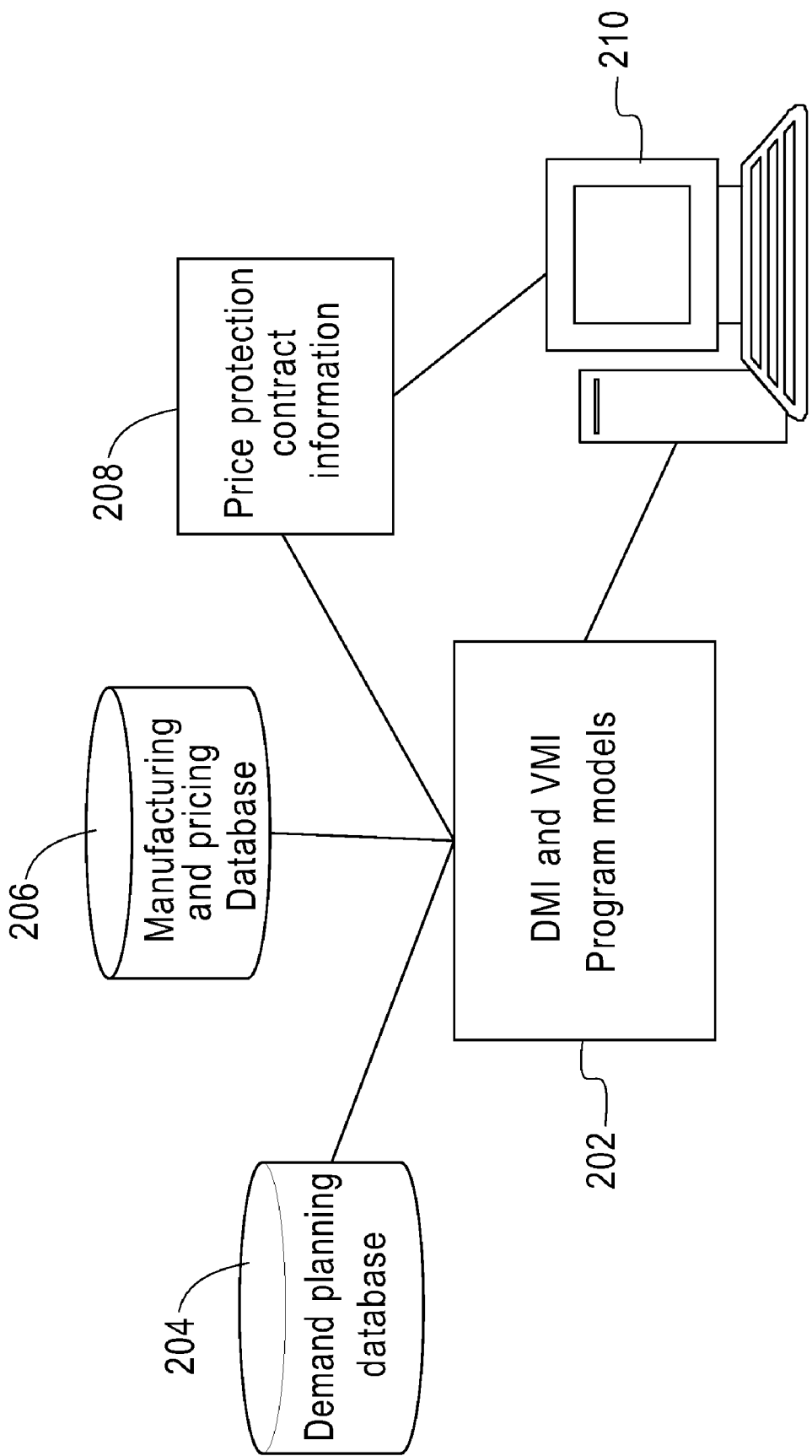
FIG. 2 is a block diagram illustrating functional components for managing inventory under price protection in one embodiment.

FIG. 2 is a block diagram illustrating functional components for managing inventory under price protection in one embodiment. Mathematical program models 102 are formulated and used to determine the inventory management policies, for instance, the quantity of supply to plan for a time period with the total expected future cost. The program models may include both the distributor centric (DMI) and vendor centric (VMI) models in a decentralized manner. Depending on whose cost is being minimized or optimized, either the DMI or VMI model may be utilized. The program models 202 may take as inputs information from the demand planning database 204, which provide parameters such as expected future demand distribution. The program models 202 also utilize manufacturing and pricing information (future price and cost distributions), for example, from a manufacturing and pricing database 206. It should be understood that the databases 204 and 206 are shown as examples only, and the data provided therein need not be from such specific databases. Rather, the expected future demand distribution and manufacturing and pricing information may be obtained from other sources such as a single database or source or directly from a user, for example, via a user interface running on a computer system 210. Information related to the price protection agreement 208 between the vendor and the distributor, for example, including the length of the price protection, amount, etc. is also input to the models 202. The information 208 may be input by a user at computer 201, or automatically obtained through computer instructions that read the information from a computer file, database, or like. The DMI and VMI program models 202 may be solved using dynamic programming techniques, which techniques may be embodied as software, firmware, circuitry, or like enabled to execute on a computer processor 210 or like. The models 202 include stochastic models, and determine an inventory replenishment plan for one or more goods taking into account a price protection agreement between at least two supply chain partners in a supply chain having decentralized control.

The inventory plans that are generated by the system and method of the present disclosure are the inventory position decisions that are made by the models. If the future demand is known with certainty, the models for both DMI and VMI generate one optimal inventory position for every time period. If the future demand is not known with certainty, the demand distributions are then used and the models are solved in every period to obtain the optimal inventory position for every period. The optimal inventory position decisions give the inventory plan in every time period as follows: If the starting inventory in any time period t is less than the optimal inventory position for that period, the distributor should order the difference to bring the inventory level up to the optimal inventory position. Else, no order is placed in time period t.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of managing inventory under price protection contract, comprising:
    obtaining an expected future demand distribution for one or more goods, future cost information associated with said one or more goods, and information associated with price protection agreement including at least length of price protection between at least two supply chain partners in a supply chain; and
    determining an inventory replenishment plan for said one or more goods over a plurality of time periods, said determining step performed using a stochastic program that considers at least the information associated with price protection agreement including at least length of price protection between at least two supply chain partners in a supply chain, the expected future demand distribution for one or more goods, and the future cost information associated with said one or more goods, said stochastic program formulated to have decentralized control,
    wherein said stochastic program is formulated as $$V_t^D(x_t) = \min_{y_t \geq x_t} \{EW_t^D(y_t) + \beta E_{D_t} V_{t+1}^D((y_t - D_t)^+)\}$$

for determining a replenishment plan for a selected period, t, of said plurality of time periods using the buyer's total expected cost from period t,
    or as $$V_t^M(x_t) = \min_{y_t \geq x_t} \{EW_t^M(y_t) + \beta E_{D_t} V_{t+1}^M((y_t - D_t)^+)\}$$

for determining a replenishment plan for a selected period, t, of said plurality of time periods using the seller's total expected cost from period t,
        wherein
        $V_t^D(.)$=Distributor's discounted total costs from period t to T;
        $V_t^M(.)$=Manufacturer's discounted cost from period t to T;
        $W_t^D(.)$=Distributor's myopic one-period costs;
        $W_t^m(.)$=Manufacturer's myopic one-period costs $\beta$=Discount factor;
        $D_t$=Demand in period t with cumulative distribution function $\Phi_t(.)$, independent of price erosion;
        T=Planning horizon length, t in 1 ... T;
        $y_t$=Order up-to level in period t, $y_t$=$x_t$+$a_t$;
        $x_t$=Starting inventory in period t (at distributor), $x_t$=$(y_{t-1} - D_{t-1})^+$;
        $a_t$=Order quantity in period t (manufacturer to distributor).

2. The method of claim 1, wherein said supply chain partners comprise at least one buyer of said one or more goods and at least one seller of said one or more goods.

3. The method of claim 1, wherein said step of determining said inventory replenishment plan includes solving a stochastic program that minimizes buyer's objective or seller's objective.

4. The method of claim 3, wherein said buyer's objective includes expected cost to the buyer.

5. The method of claim 3, wherein said seller's objective includes expected cost to the seller.

6. The method of claim 1, wherein said determining step includes at least:
    formulating a stochastic program that determines the inventory replenishment plan based on an objective and subject to one or more constraints.

7. The method of claim 6, wherein said objective includes the buyer's objective and said one or more constraints include inventory balance constraints.

8. The method of claim 6, wherein said objective includes the seller's objective and said one or more of constraints include inventory balance constraints.

9. A program storage device readable by a machine, tangibly embodying a program of instructions executable by the machine to perform a method for managing inventory under price protection plan, comprising:
    obtaining an expected future demand distribution for one or more goods, future cost information associated with said one or more goods, and information associated with price protection agreement including at least length of price protection between at least two supply chain partners in a supply chain; and
    determining an inventory replenishment plan for said one or more goods over a plurality of time periods, said determining step performed using a stochastic program that considers at least the information associated with price protection agreement including at least length of price protection between at least two supply chain partners in a supply chain, the expected future demand distribution for one or more goods, and the future cost information associated with said one or more goods, said stochastic program formulated to have decentralized control,
    wherein said stochastic program is formulated as $$V_t^D(x_t) = \min_{y_t \geq x_t} \{EW_t^D(y_t) + \beta E_{D_t} V_{t+1}^D((y_t - D_t)^+)\}$$

for determining a replenishment plan for a selected period, t, of said plurality of time periods using the buyer's total expected cost from period t, or as $$V_t^M(x_t) = \min_{y_t \geq x_t} \{EW_t^M(y_t) + \beta E_{D_t} V_{t+1}^M((y_t - D_t)^+)\}$$

for determining a replenishment plan for a selected period, t, of said plurality of time periods using the seller's total expected cost from period t,
wherein
$V_t^D(.)$=Distributor's discounted total costs from period t to T;
$V_t^M(.)$=Manufacturer's discounted cost from period t to T;
$W_t^D(.)$=Distributor's myopic one-period costs;
$W_t^M(.)$=Manufacturer's myopic one-period costs
$\beta$=Discount factor;
$D_t$=Demand in period t with cumulative distribution function $\Phi_t(.)$, independent of price erosion;
T=Planning horizon length, t in 1 . . . T;
$y_t$=Order up-to level in period t, $y_t=x_t+a_t$;
$x_t$=Starting inventory in period t (at distributor), $x_t=(y_{t-1}-D_{t-1})^+$;
$a_t$=Order quantity in period t (manufacturer to distributor).

10. The program storage device of claim 9, wherein said supply chain partners comprise at least one buyer of said one or more goods and at least one seller of said one or more goods, and wherein said step of determining said inventory replenishment plan includes solving a stochastic program that minimizes buyer's objective or seller's objective.

* * * * *